(12) United States Patent
Strawczynski et al.

(10) Patent No.: US 6,628,641 B1
(45) Date of Patent: Sep. 30, 2003

(54) HEADER ERROR DETECTION FOR WIRELESS DATA CELLS

(75) Inventors: Leo Strawczynski, Ottawa (CA); Bill W. A. Gage, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/997,982

(22) Filed: Dec. 24, 1997

(51) Int. Cl.$^7$ ................................................ H04L 12/56
(52) U.S. Cl. ...................................... 370/349; 370/474
(58) Field of Search ................................ 370/345, 347, 370/350, 389, 392, 395, 465, 471, 474, 476, 395.1; 714/746, 752, 758, 774, 776, 798, 799

(56) References Cited

U.S. PATENT DOCUMENTS

| | | | |
|---|---|---|---|
| 5,161,194 A | | 11/1992 | Ujie |
| 5,258,762 A | | 11/1993 | Cabon et al. |
| 5,379,116 A | | 1/1995 | Wada et al. |
| 5,383,203 A | * | 1/1995 | Miyazono ................... 714/785 |
| 5,404,374 A | | 4/1995 | Mullins et al. |
| 5,487,061 A | * | 1/1996 | Bray ............................ 370/252 |
| 5,557,621 A | | 9/1996 | Nakano et al. |
| 5,563,887 A | | 10/1996 | Harasaki |
| 5,600,653 A | * | 2/1997 | Chitre et al. ................. 370/474 |
| 5,638,371 A | | 6/1997 | Raychaudhuri et al. |
| 5,648,969 A | | 7/1997 | Pasternak et al. |
| 5,699,369 A | * | 12/1997 | Guha .......................... 714/774 |
| 5,710,756 A | * | 1/1998 | Pasternak et al. ........... 370/216 |
| 6,005,871 A | * | 12/1999 | Petersen et al. ............. 370/474 |
| 6,028,844 A | * | 2/2000 | Hao et al. .................... 370/242 |

FOREIGN PATENT DOCUMENTS

| WO | WO 97/13292 | 4/1997 |
|---|---|---|

OTHER PUBLICATIONS

The ATM Forum Technical Committee; Frame based User–to–Network Interface (FUNI) Specifications; af–saa–0030.000; Sep., 1995.

IEEE Journal on Selected Areas In Communicaitons, A Publication of The IEEE Communications Society; Jan. 1997, vol. 15, No. 1, ISACEM (ISSN 0733–8716); Wireless ATM (Guest Editors—Hsing, Cox, Van Landegem).

1996 IEEE International Conference On Communications; Jun. 23–27, 1996; Conference Record vol. 1 of 3; Forward Error Correction Schemes for Wireless ATM Systems; Satoru Aikawa, Yasushi Motoyama and Masahiro Umehira; NTT Wireless Systems Laboratories.

Dynamics of TCP Traffic over ATM Networks; Allyn Romanow and Sally Floyd; This is a slightly–expanded version of a paper that appeared in IEEE Journal on Selected Areas In Communications, May, 1995.

IEEE Journal on Selected Areas In Communications, vol. 12, No. 8, Oct. 1992; ATM–Based Transport Architecture for Multiservices Wireless Personal Communication Networks; Dipankar Raychaudhuri and Newman D. Wilson; © 1994 IEEE.

* cited by examiner

*Primary Examiner*—Kwang Bin Yao
(74) *Attorney, Agent, or Firm*—Jeffrey M. Measures (57) ABSTRACT

An improved method and transceiver for using the method for detecting header errors includes a header processor for reconfiguring an ATM cell header by extracting the 8 bit header error check (HEC) and replacing it with an enhanced 16 or 24 bit HEC (EHEC). On the receive path, the received header is compared to the EHEC and if errors are indicated, the cell is discarded. Enhancements include FEC encoding on the entire cell during transmission, and if during reception uncorrectable errors exist using said EHEC to determine whether the error is in the header or is in the payload. If a cell with an error in its payload belongs to a group of related cells, for example an AAL5 frame, the system discontinues the transmission of the remaining cells of the frame.

34 Claims, 9 Drawing Sheets

HEADER ERROR DETECTION FOR WIRELESS DATA CELLS

FIELD OF THE INVENTION

The present invention relates to wireless transmission systems for transmitting data cells, for example asynchronous transfer mode (ATM) cells, wherein the header includes control information (e.g., address information) controlling the destination of the cell.

BACKGROUND TO THE INVENTION

Conventional asynchronous transfer mode (ATM) systems transmit 53 byte cells comprising a 5 byte header and a 48 byte payload. Typically, the 5 byte header includes 4 bytes of control information (e.g., address information) and an eight bit checksum field called the header error check or code (HEC). The HEC is included as a check that the header information is not corrupted in order to avoid the incorrect forwarding of the cell. This 8 bit checksum field is typically sufficient for this purpose for ATM cells transmitted over fiber optic networks, wherein the medium is relatively reliable and the vast majority of errors are single-bit errors.

However, digital radio transmission systems (e.g., TDMA, CDMA, etc.) for wireless ATM systems are significantly more error prone than fiber optic networks. Furthermore, the errors are not predominantly single bit errors, but rather, are often bursty in nature. Thus, an 8 bit HEC is often insufficient to ensure that the cell (or more particularly, the header portion of the cell) is properly received with sufficient reliability.

Improved forward error correction (FEC) techniques have been proposed for alleviating these problems. However, these techniques still forward cells with uncorrectable errors in their headers in unacceptable proportions for many applications. Note that for a given code length there is a higher probability of detecting an error, using an error detection technique than there is for determining that a detectable but non-correctable error pattern occurred using an FEC technique. Furthermore, some prior art techniques propose FEC be applied to entire cells or blocks of cells, and discarding cells or blocks of cells if the FEC process cannot correct all errors. These techniques are problematic as they discard cells (or group of cells) even if the headers in the discarded cell(s) are correct. In some situations, this is undesirable, as a payload with some errors is better than missing an entire payload for some applications (e.g., voice, video conferencing, etc.).

SUMMARY OF THE INVENTION

An object of the present invention is to provide an improved transceiver architecture and method for detecting errors in data cells transmitted by wireless communication. Advantageously, the improved method and architecture for implementing the method more reliably detects header errors than prior art systems. This system thus reduces the likelihood that cells are misdirected.

Advantageously, the inventors have recognised that for a given code length there is a higher probability of detecting an error using an error detection technique than there is for determining that a detectable but non-correctable error pattern occurred using an FEC technique. Furthermore, the inventors have realised that for some applications, as long as the header is correct, there is utility in forwarding a cell with a corrupted payload. Thus, a further object of the invention is to increase the probability of detecting a cell with header errors without increasing the probability of (unintentionally) discarding a received cell which has a valid header compared to prior art systems which rely solely on FEC and/or conventional header error checks.

The improved transceiver architectures and methods can be used in both point-to-point and point-to-multipoint radio units. In either system, the transmitter of a cell reconfigures the cell for transmission such that errors which occur in the header can be detected by the receiving radio unit with greater accuracy than conventional techniques. In particular, a reconfigured cell according to this invention includes enhanced header error detection coding for example, by including an extended header error code (EHEC). The receiving unit retrieves the reconfigured cell from the transmitted radio bit stream and detects header errors using the enhanced header error detection coding.

If no header errors are detected by the receiving unit, various treatments can be applied. Typically, the enhanced header error detection coding is replaced by a conventional header error coding check if no further wireless transmission is required. The system can then simply forward such a cell, relying on higher layer protocols to determine what treatment should be performed on cells with corrupted payloads.

Thus, according to a broad aspect of the invention there is provided a transceiver for receiving and transmitting data cells over a wireless interface, said transceiver comprising: a block processor having a transmit path for reconfiguring cells for transmission over the wireless interface and for receiving transmitted signals and processing received reconfigured cells; wherein said block processor includes: a transmit header processor for assembling a new header for a cell to be transmitted, including: means for extracting HEC from said cell, and means for calculating and inserting an EHEC into said cell header; a receive header processor, including: means for extracting EHEC from a received cell, means for replacing said EHEC with an HEC, and means for detecting errors in said received cell header; and means for discarding a received cell if an error in the header is detected.

In accordance with another aspect of the present invention there is provided a method for treating transmission errors in data cells which include a first data field, a check on said first data field, and at least one additional data field, wherein each cell is transmitted with additional bits for the purpose of allowing a receiver of the cell to determine whether there are uncorrectable errors, said method comprising:

detecting errors on said first data field;
    detecting uncorrected errors on said cell;
    determining an error is present in said at least one additional data field if an uncorrected error is detected in said cell and no error is detected in said data field; and
    executing an appropriate treatment process depending on the nature of the cell and the field in error.

Such a method is particularly advantageous to wireless transmission of data cells wherein said first data field is a header and said at least one additional data field is a payload.

Other aspects of the invention provide for enhanced treatments and optional features. For example, additional Forward Error Correction or error detection coding can be applied, either to cells or blocks of cells. FEC has the advantage of generally improving the radio transmissions. Either way, this additional coding can help determine the type of treatment to be applied. For example, if detectable but uncorrectable errors are detected on a particular cell, but no error is detected in the header, then the system can conclude that there is an error in the payload. This can allow systems to select between various treatments, including:

forwarding the cell, forwarding the cell with a flag, discarding the cell, and producing an indication of the error to a higher layer protocol.

Advantageously, for groups of related cells (hereafter called a message) for which the payload of every cell is necessary, special treatments can be applied to conserve bandwidth by discontinuing the forwarding and/or transmission of subsequent cells of a message once a payload error has been detected in any cell of a message.

BRIEF DESCRIPTION OF THE DRAWINGS

The present invention, together with further objects and advantages thereof will be further understood from the following description with reference to the drawings in which.

DETAILED DESCRIPTION OF THE PREFERRED EMBODIMENTS

We will discuss the use of preferred embodiments of the invention as they relate to asynchronous transfer mode (ATM) wireless systems. However, it should be appreciated that the invention is also applicable to other data cell systems which include a header (including address and other control information), and a header error check on that header which is insufficient to reliably detect errors which may occur during wireless transmission. Also, one should note that the invention is applicable to various wireless transmission protocols, for example, TDMA, CDMA, GSM, etc.

Figure 1:
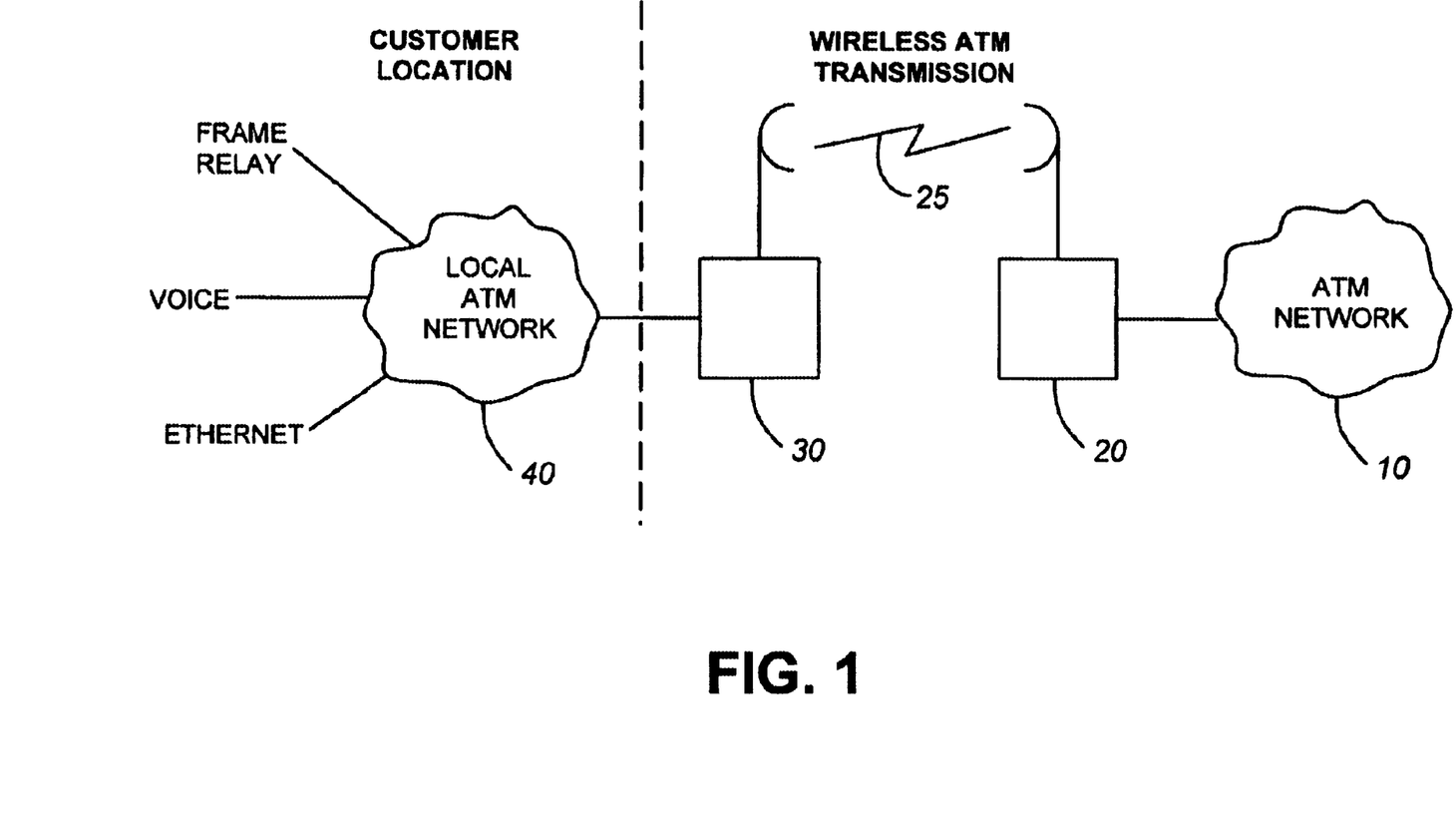
FIG. 1 is a diagram illustrating a point-to-point radio network which utilizes the invention.

FIG. 1 illustrates one form of point-to-point radio systems wherein two ATM networks 10,40 are bridged by radio transmission 25 between radio units 20 and 30. For example, public ATM network 10 sends ATM cells directed to a user of the local ATM network 40. In this example, ATM network 10 is operated by a service provider and local ATM network 40 represents the local network of a customer of the service provider. This local network can be, for example, a network within a building or a campus which support various applications including voice, frame relay, ethernet, etc. A radio or microwave link 25 by radio unit 30 communicates with base station 20. Base station 20 may also be connected to a base station controller and a mobile switching centre (not shown). In this situation, both radio units 30 and 20 can be thought of as trunk units supporting a plurality of communication links.

Figure 2:
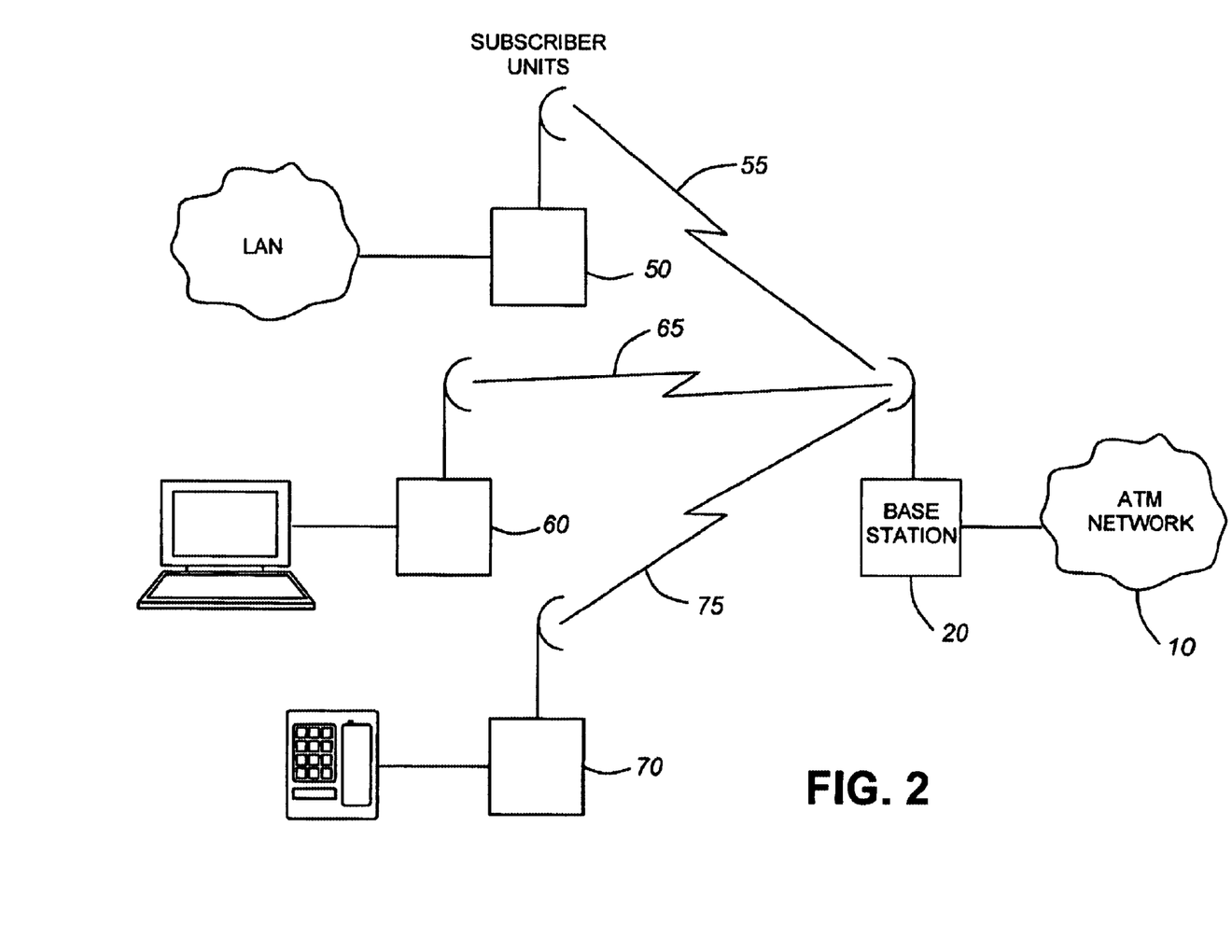
FIG. 2 is a diagram illustrating a point-to-multipoint radio network which utilizes the invention.

FIG. 2 is a point-to-multipoint radio system wherein the base station 20 communicates to a plurality of subscriber units 50, 60 and 70 via wireless communication links 55, 65 and 75 respectively. Various communication services can be provided. Although subscriber units can support multiple applications, for simplicity we show, by way of example, a subscriber unit 70 which provides voice communications, a subscriber unit 60 which is connected to a computer and provides multimedia data applications, and subscriber unit 50 which represents a radio unit conduit to a local area network and supports a plurality of communication links with the base station 20.

Figure 3:
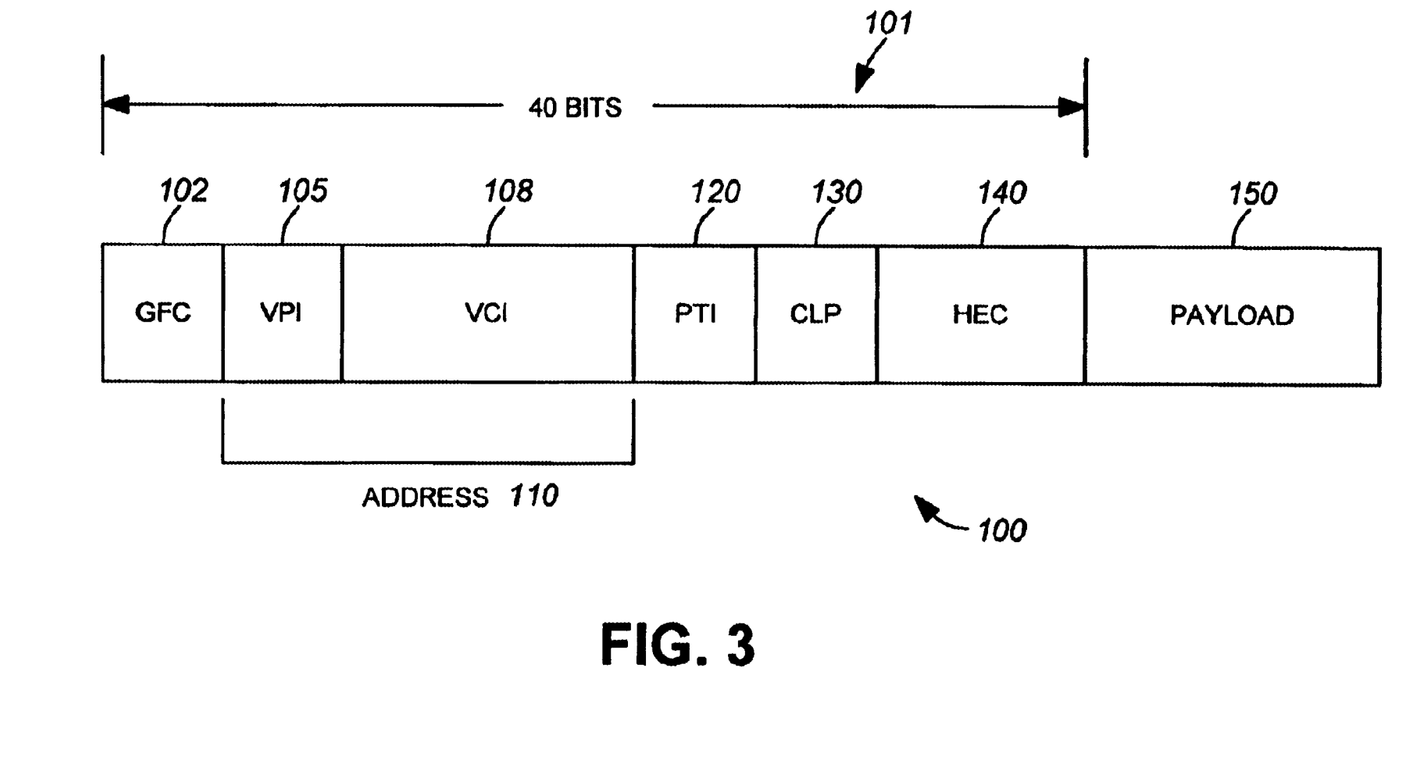
FIG. 3 is a block diagram illustrating the format of a conventional ATM cell.

Referring now to FIG. 3, FIG. 3 is a schematic diagram illustrating the format of a conventional ATM cell 100 comprising a header of 40 bits (5 bytes) and a payload 150 of 48 bytes. The header 101 comprises a generic flow control (GFC) field 102 and an address section 110 which includes, a virtual path identifier (VPI) field 105 and a virtual channel identifier field (VCI) 108. The header also includes a payload type identifier PTI field, a cell loss priority (CLP) field and a header error check (HEC) field 140. Note that the described cell is for the UNI (user network interface) interface as opposed to the NNI (network network interface) as will be appreciated by the person skilled in the art. In a conventional ATM cell, the HEC is a cyclic redundancy code (CRC) of 8 bits calculated on the previous 32 bits of the header. As stated above, this 8 bit HEC is typically adequate for reliable transmission mediums, for example, fiber optics. However, wireless transmission links are not as reliable. The probability that a cell which is transmitted by a wireless link has its address information corrupted such that the address is misdirected (which can include being directed to another user), without that corruption being detected by the conventional HEC is sufficiently high to be problematic. Consequently, according to the preferred embodiment of the invention, prior to wireless transmission, the ATM cell is reconfigured as illustrated in FIG. 4.

Figure 4:
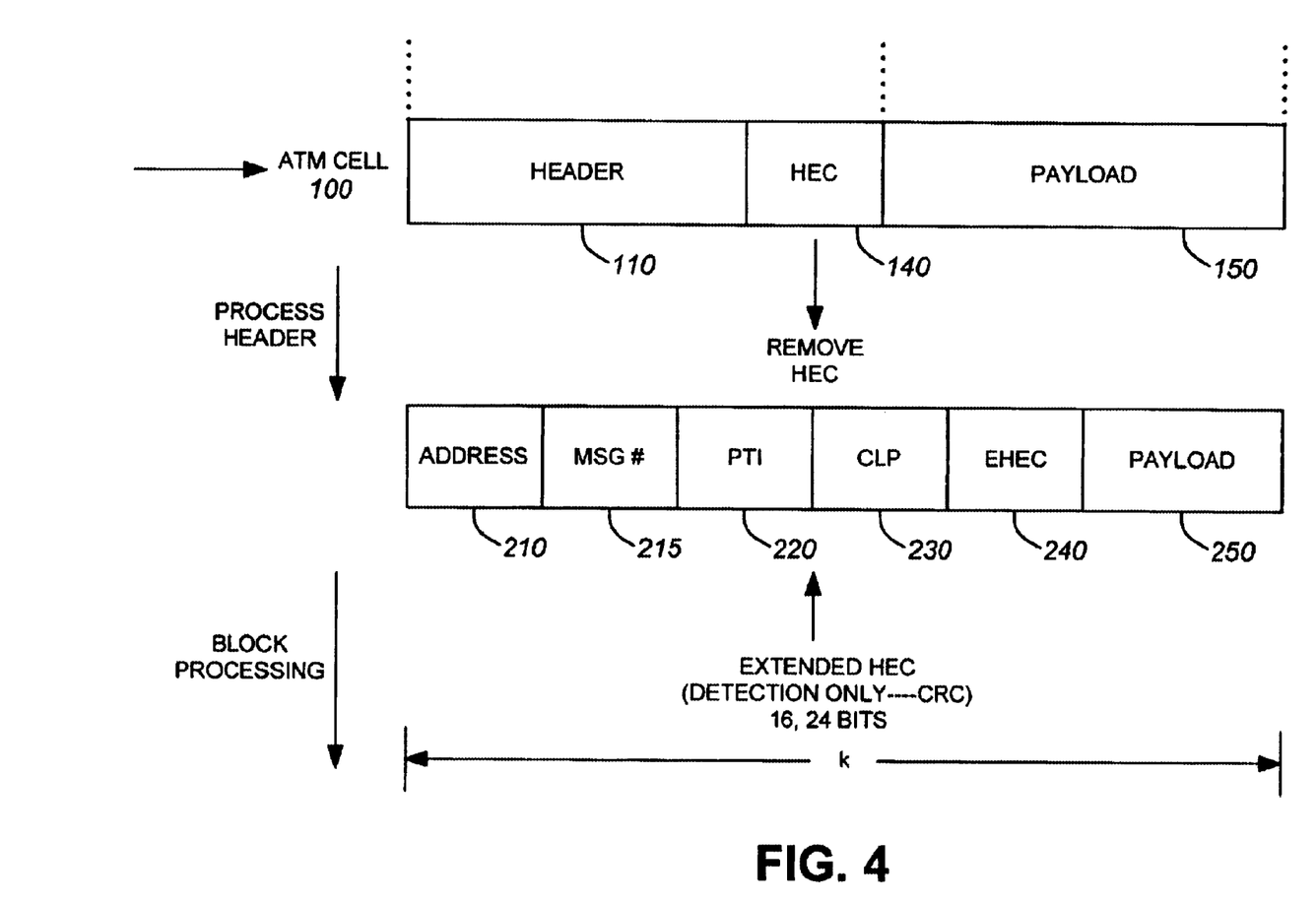
FIG. 4 is a block diagram illustrating a conversion process for reconfiguring a conventional ATM cell into a reconfigured data cell for transmission according to a preferred embodiment of the present invention.

According to the method shown in FIG. 4, a process header step takes place wherein the conventional 8 bit HEC field is removed and an extended HEC 240 is added. This extended HEC will be referred to as EHEC and is preferably either 16 or 24 bits in length. The EHEC is calculated on the remaining portions of the reconfigured header. According to this embodiment of the invention, the reconfigured header includes a compressed address field 210, an optional additional message sequence number identifier 215, as well as the PTI 220 and CLP 230 fields.

After the process header step is complete, a block processing step occurs which preferably includes FEC encoding, interleaving, etc. for producing the bit stream to be transmitted.

Figure 5:
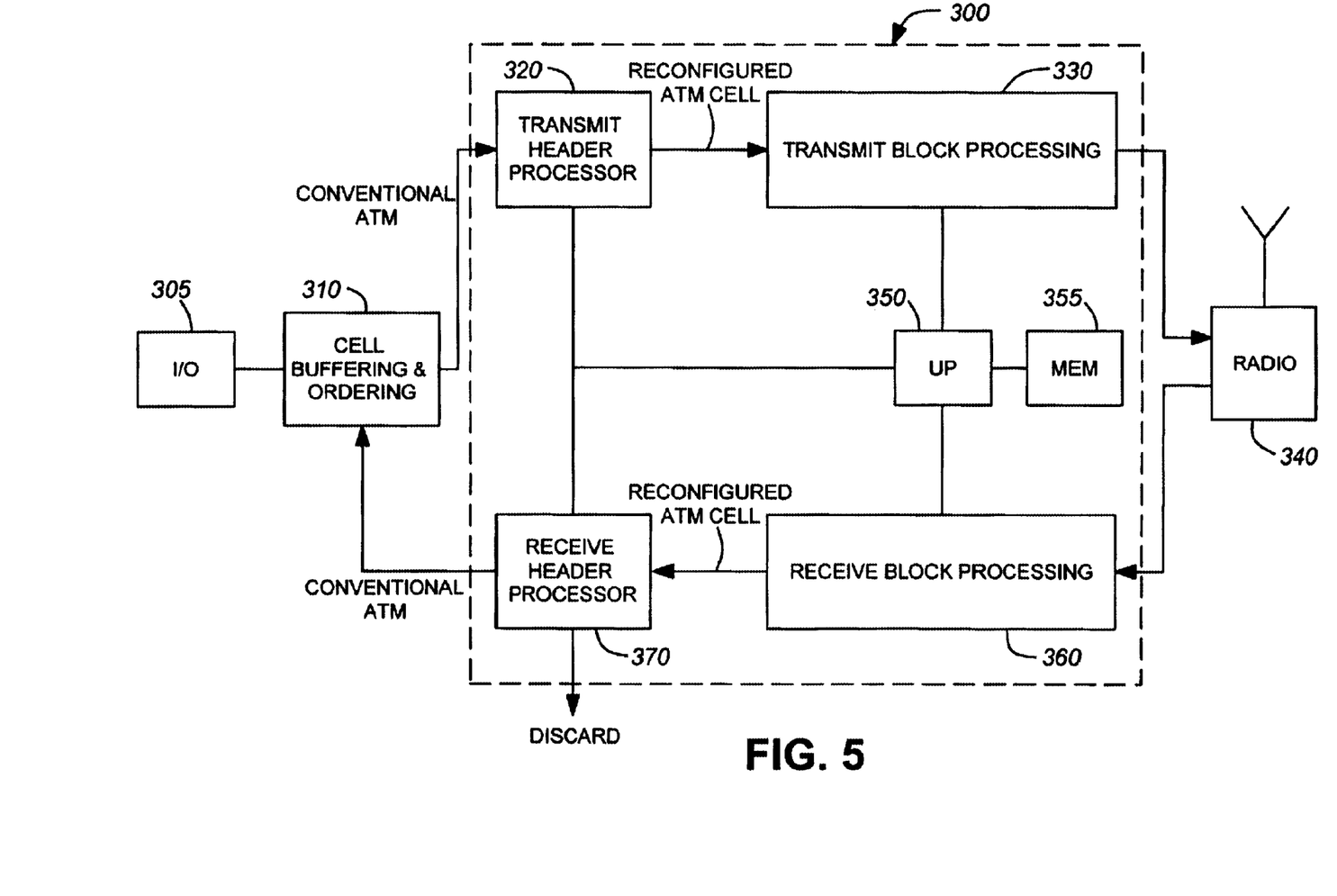
FIG. 5 is a block diagram illustrating a transceiver architecture according to a preferred embodiment of the present invention.

FIG. 5 illustrates a transceiver architecture according to a preferred embodiment of the present invention. This transceiver architecture will be discussed with respect to a radio unit, for example, radio unit 30 of the point-to-point radio network as shown in FIG. 1. It should be appreciated that with suitable modifications the described transceiver architecture is also suitable for the base station 20 or the subscriber units of the point-to-multipoint radio network illustrated in FIG. 2.

The transceiver according to the present invention includes a cell input/output (I/O) connection, a block processor 300 and radio 340. The cell input/output connection comprises a cell buffering and ordering block 310 and I/O unit 305. For transmission, the cell buffering block 310 forwards ATM cells from the input portion of I/O unit 305 to a transmit header processor 320 of the block processor 300. For reception, the cell buffering and ordering block 310 buffers and orders cells output from the receive header processor 370 of block processor 300 and forwards the cell to the output portion of the I/O unit 305. Note that in this example the I/O unit 305 is connected to a local ATM network 40 wherein ATM cells carrying various forms of data are communicated via the I/O unit 305. Note that in a subscriber unit, the I/O unit, if not connected to a network carrying ATM traffic, will be connected on ATM cell processor (not shown), for example, a voice processor for converting between digitized PCM voice and ATM cells, or a data processor for converting between ethernet frames and ATM cells.

In this embodiment, the block processor 300 is controlled by a control unit (not shown) which includes microprocessor 350 and associated memory 355. The associated memory includes working memory, for example RAM, as well as software instructions for carrying out the functions of the various blocks. We will first discuss the primary function of both the transmit header processor and then the receive header processor and then revisit these blocks with optional functionality.

The block processor has a transmit path for reconfiguring cells from said data cell input connection (e.g., blocks 305 and 310) into a reconfigured format for transmission over a wireless interface (for example, CDMA, GSM, TDMA, etc.) via the radio unit 340. The block processor also has a receive path for receiving a digital bit stream from the radio 340 (which is transmitted over the wireless interface) and for processing the transmitted signals. The received reconfigured cells are processed by the receive header processor 370.

The transmit header processor 320, first checks the HEC to validate the header (and discards the cell if its not valid). Then it assembles a new header for the cell to be transmitted, and includes means for extracting the existing HEC from the cell, and means for calculating and inserting an extended HEC (EHEC) into the cell header. These means, as well as additional means described herein, include either a DSP or the control unit executing software instructions for carrying out these functions, or alternatively include equivalents such as discrete circuitry, programmable gate arrays, ASICs, etc. By adding a 16 bit EHEC, the total length of the header is enlarged by 8 bits; alternatively, the header can be compressed in order to maintain a 53 byte cell size. Additional header processing which may optionally be carried out will be discussed below. This reconfigured cell is then sent to the transmit block processing stage 330 which preferably performs the step of adding additional bits for the purpose of allowing a receiver to determine whether there are uncorrectable errors. FEC is preferably used, not only to allow a receiver to determine whether there are uncorrectable errors, but also to increase the reliability of the radio transmissions. In the preferred embodiment shown, forward error correction (e.g., block, convolutional, turbo, or concatenated coding) encoding and interleaving is performed for producing the digital bit stream to be transmitted by the radio unit 340 over the wireless interface. These are standard functions and can be carried out using conventional methods. Note that the additional bits and the ATM cells do not need to be aligned in this embodiment. In other words, the transmit block processing stage can add additional bits for each cell or it can accumulate multiple cells or parts of cells into a block and add bits that apply to the block as a whole.

With reference to the receive path, the digital bit stream received by radio unit 340 undergoes receive block processing 360. This stage reverses the block processing carried out by the transmit block processor, as well as performs synchronization. After the block processing stage 360, the reconfigured ATM cells which were transmitted over the wireless interface are retrieved. Each reconfigured ATM cell is then sent to the receive header processor 370. The receive header processor includes means for extracting the EHEC from the received cell, means for replacing the EHEC with the conventional HEC and means for detecting errors in said received cell header. These functions are carried out by comparing the value of the EHEC with the result of a calculation based on the header, which if not corrupted, would produce the value of the EHEC. If this comparison indicates an error, the cell is discarded. If no error in the header is detected, then the receive processor forwards the cell (which now has been configured back into conventional ATM format) to the cell input/output unit for conventional processing.

We will now discuss additional and optional features. One optional feature provides a method for treating errors by performing an additional operation which indicates whether there is an (uncorrectable) error in a cell as well as using, in this embodiment, the enhanced header error check on the header in order to determine whether there are errors in the header, and acting accordingly. This optional feature will be discussed with reference to FIG. 6 which is a flow chart illustrating the receive path process steps carried out according to a preferred embodiment. For this optional feature either a forward error correction (FEC) or an additional error detection step is performed on each cell. Note that this additional step can be performed in a block, which includes a group of cells, although this adds complexity and an increased probability of discarding a good cell, and is therefor, although possible, not preferred.

Figure 6A:
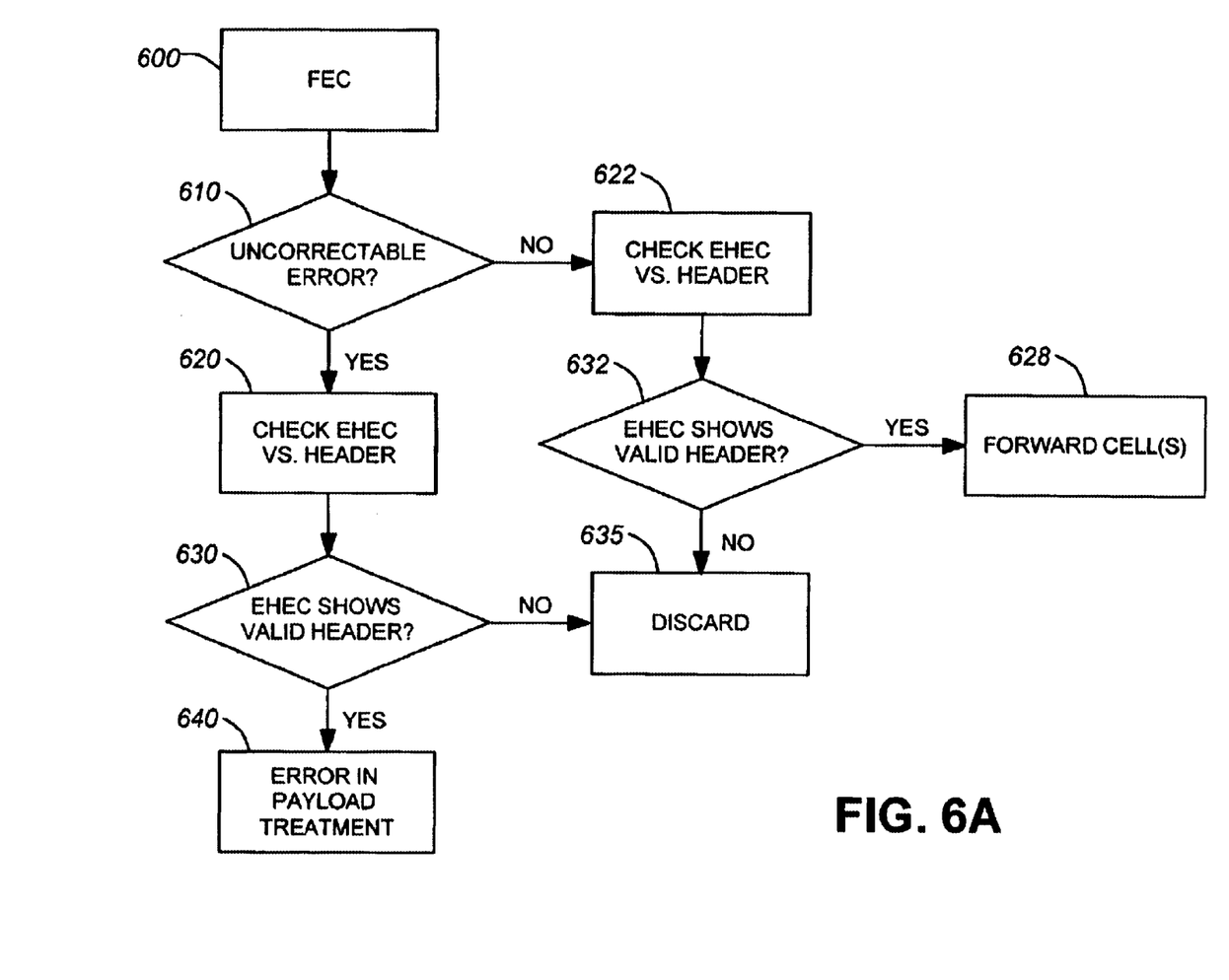
FIGS. 6a and 6b are flowcharts illustrating optional error treatments according to a preferred embodiment of the present invention.

In this example, each reconfigured cell is FEC encoded prior to transmission. During reception, the receive block processor performs FEC decoding 600. During this step, correctable errors are corrected. As part of the FEC decoding process, a determination is made 610 as to whether there were detectable but uncorrectable error patterns. If there are no uncorrectable errors, the EHEC header error check step 622 is performed, in order to determine 632 whether the EHEC shows a valid header was received. If a valid header was received, then the cell is reconfigured back to conventional ATM format and forwarded 628, otherwise it is discarded 635. Note that steps 622 and 632 are preferable as it is possible that step 610 will incorrectly determine that there were no uncorrectable errors (as the process is not infallible).

Returning to step 610, if there is an indication that there was an uncorrectable error in the cell, a determination is made (steps 620 and 630) as to whether there was a valid header received. Step 620 is identical to step 622 and step 630 is identical to step 632. However, both are shown in this figure as steps 622 and 632 are not necessary whereas steps 620 and 630 are necessary for this embodiment. If there was an error in the header, the cell is discarded step 635. If the header is valid, then the combination of steps 610 and 630 indicate that there is an error in the payload and an appropriate error in the payload treatment step 640 is performed.

Various treatments can be applied depending on the nature of the payload. Treatments include forwarding the cell, forwarding the cell with a flag (e.g., in the CLP field indicating that this cell should be preferentially discarded in the event of network congestion), discarding the cell, or producing an indication to a higher layer protocol of the error (which can be used e.g., to send a control packet or an ARQ message). For example, for voice, realtime video (e.g., video conferencing), or other streaming G services, it is often better to forward a cell with errors in the payload than to discard the entire cell. Thus, for cells of this type the treatment would be to forward cells. Note that the type of service is listed in a table or other data structure for each virtual circuit and can therefor be determined by a table lookup on the header, as information and queues (for buffering cell bursts) are maintained on a per-vc basis in the preferred embodiment as is known in the art. As an alternative for.some applications, the system can predefine a range of addresses for payload types.

Figure 6B:
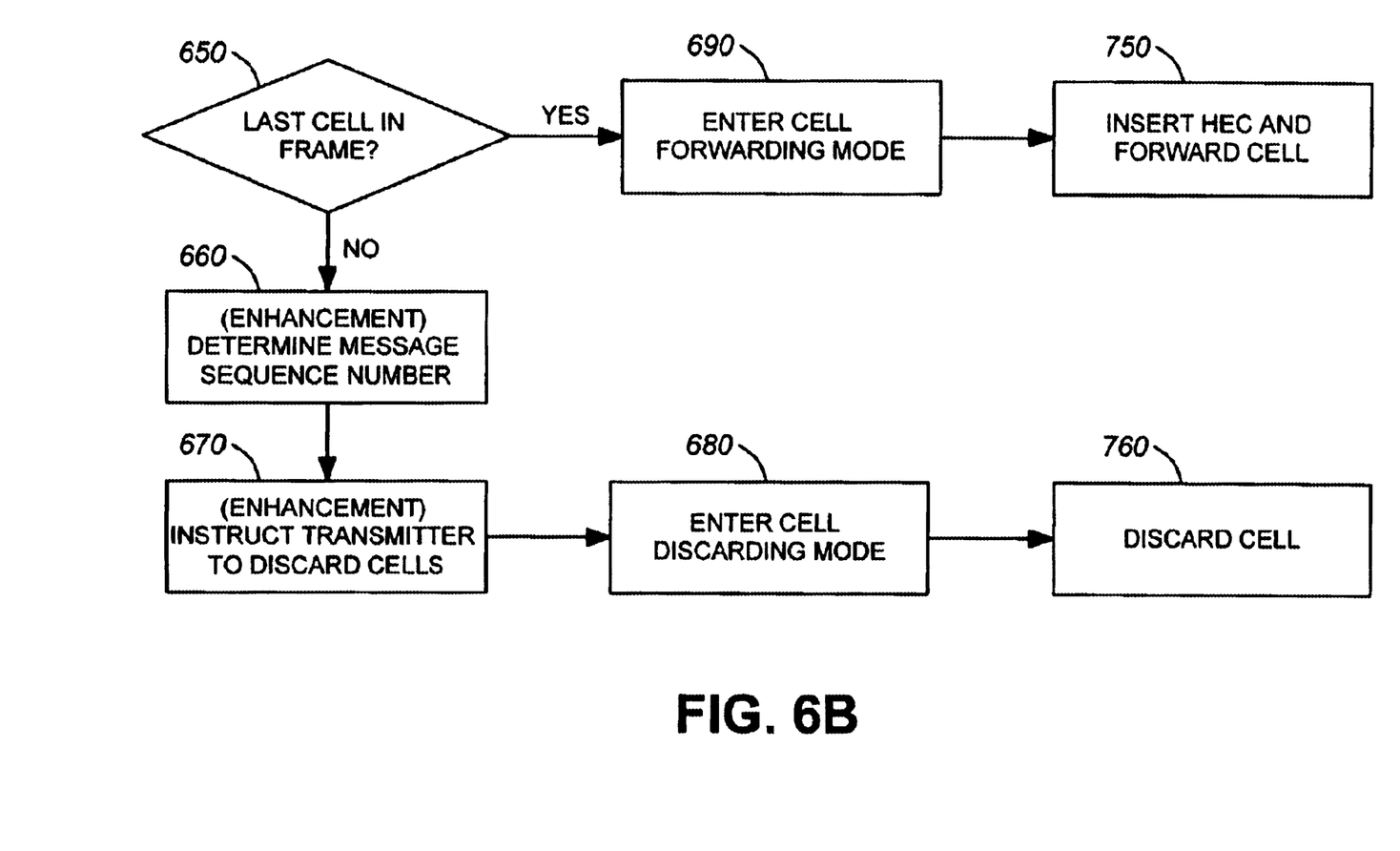

One advantageous application for this optional feature is the treatment shown in FIG. 6b. In order to understand this treatment, we will first refer to FIG. 7, which illustrates a series of associated cells 400, 420, 430. These related cells each carry a segment from the same higher layer frame and therefor each cell needs to be received in order to be useful. This series of associated cells will be referred to as a message. Note that although only three cells are shown, a plurality of cells between cell 420 and 430 may form part of the single message 450. Typically, for example, for ATM adaptation layer 5 (AAL5) frames, the payload type identifier (PTI) identifies the last cell of a particular message. According to AAL5, the PTI is a three bit field wherein the last bit is set to zero except for the last cell, and wherein the last cell of a message has the last bit of the PT field set to one. This format can be maintained or alternatively, a single bit field can be used as shown for the PTI field in FIG. 7 if header compression is desirable. It is useful to identify the final cell of a message as the final cell of a message typically includes control information within its payload so that the higher layer levels can process the entire message.

Figure 7:
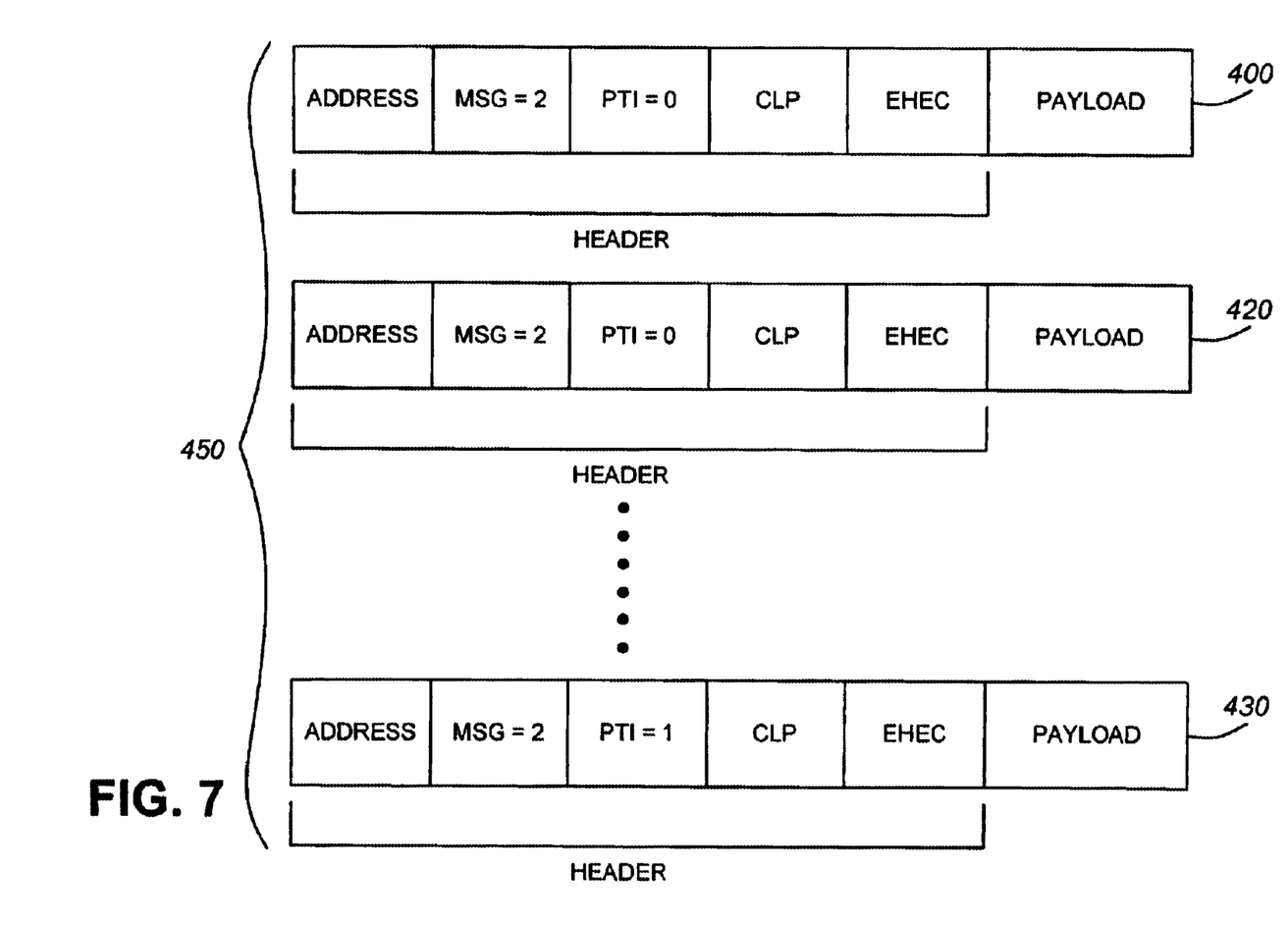
FIG. 7 is a block diagram illustrating a series of cells comprising a single message according to a preferred embodiment of the present invention.

According to the preferred embodiment shown in FIGS. 6 and 7, an additional message sequence field is added to the header by the transmit header processor for identifying to which message a particular cell belongs. This field is used to differentiate between messages, as each radio unit can transmit a series of messages before the receiver can acknowledge them. The address field can consist of the VPI/VCI fields or alternatively, can represent a compressed address field.

The combination of the message field and the PTI field allows for an added feature of the preferred embodiment of the invention, which saves transmission bandwidth by discontinuing the transmission of the remaining cells of a message if the payload of any cell of the message is corrupted. This is particularly suited for wireless protocols which do not send ARQ acknowledgements on a per packet basis, but rather, rely on higher layer retransmission requests where necessary. In such a system, the retransmission request will require the retransmission of the entire message, so continuing to transmit cells prior to the retransmission effectively wastes bandwidth.

FIG. 6b illustrates an example of the treatment steps for a message once it is determined that a message treatment is applicable (e.g., is this cell part of an AAL5 frame). Assuming this is the case, then if the PTI indicates this is the last cell of a frame 650, then the system forwards the cell 690, 750 to signal the end-of-frame to the receiving end. Otherwise, if the PTI indicates this is not the last cell, then the cell is discarded. This will ensure that bandwidth is not wasted in the ATM network by the transmission of a cell payload that cannot be used. As a further enhancement, bandwidth on the radio link can be conserved through the following optional procedure: determine the message sequence number from the extended cell header 660 and send a control packet instructing the transmitting unit to discontinue transmitting the remaining non-final cells of the frame 670. Note that since the final cell of the frame contains important control information, the final-cell of the frame is preferably still transmitted. The receiver then enters cell discarding mode 680, wherein this cell is discarded 760 (as is any subsequently received non-final cell of this message) Note that due to transmission delays, other cells of the message may be received by the receiving unit (for example, base station 20) before the transmitting unit (radio unit 30 in this example) receives the discontinue packet 670. Step 670 preferably only sends one discontinue packet per message by checking whether it is already in discard mode for this message sequence number prior to transmitting the discontinue packet.

Figure 8:
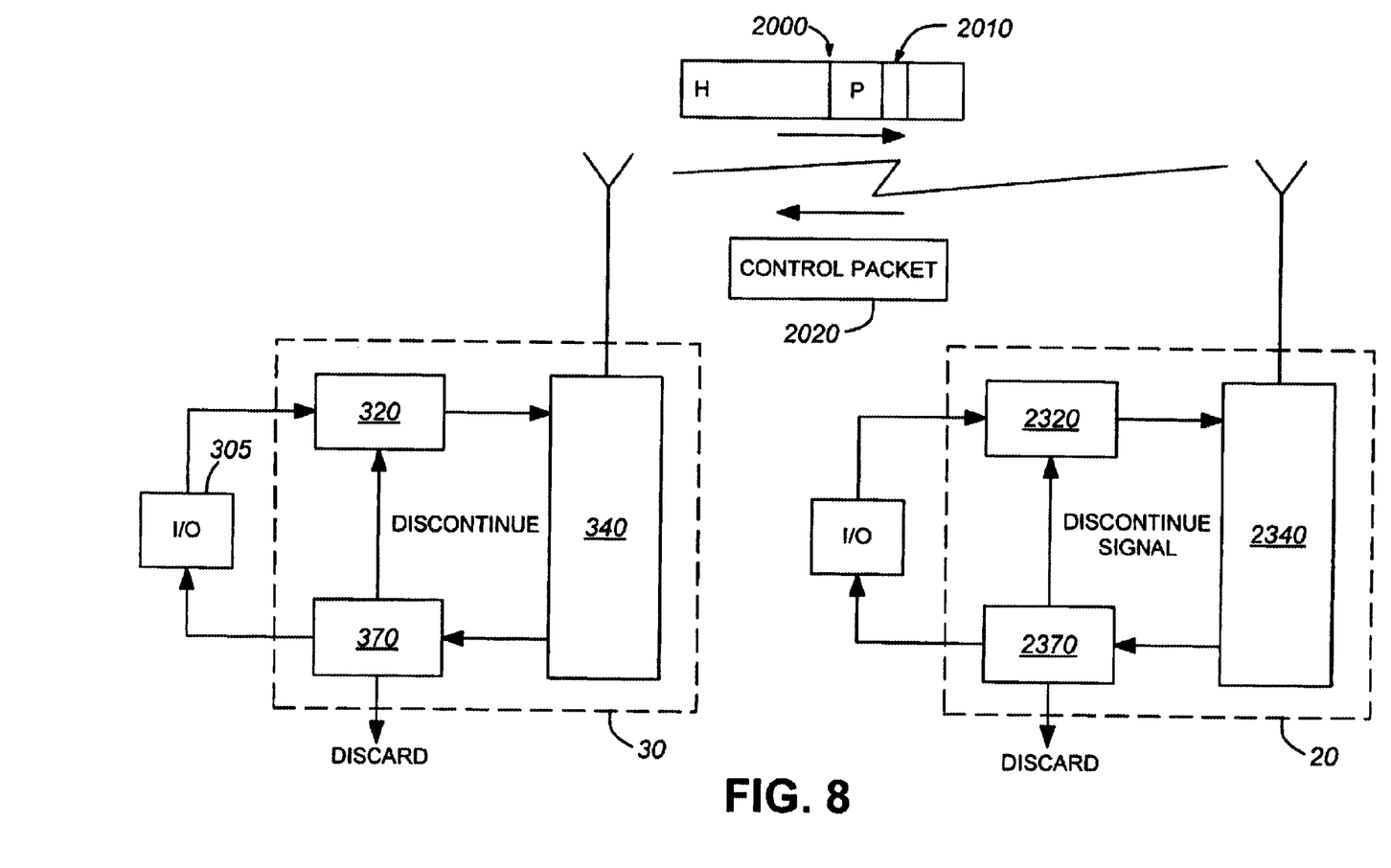
FIG. 8 is a block diagram illustrating how both a transmitter and a receiver treat a message according to a preferred embodiment of the present invention.

Referring now to FIG. 8, we will now describe how ATM cells forming part of a message (i.e., a frame) are processed according to the treatment of FIG. 6b for a preferred embodiment of the invention with reference to the radio unit 30 transmitting a message to base station 20. The cells comprising a particular message (which for convenience we will label as message number two) arrive via the input/output unit 305 and are buffered and ordered in the usual manner. These cells are then sent to the transmit header processor 320 which processes the header in the following manner. First, the header is evaluated to determine whether the cell belongs to a message, and if so, whether the cell is the final cell of a particular message. The address (e.g., the virtual circuit) and PTI fields provide this information. If the cell is a non-final cell of a message, the transmit header processor determines whether it has received a discontinue signal from its receive header processor 370 to discontinue the transmission of non-final cells for that message as will be discussed below. Assuming no such signal is received, the transmit header processor 320 adds a message sequence number field to the header identifying to which message the cell belongs. Optionally, the address information of the ATM cell is compressed by the transmit header processor. The transmit header processor then extracts the HEC from the cell and inserts an EHEC calculated on the reconfigured header. The reconfigured cell is then sent to the block processing stage as described above, wherein the cell undergoes FEC encoding. The encoded cell 2000 is then transmitted via the radio 340 to the BTS 20. As can be seen in FIG. 8, an error 2010 occurs during wireless transmission, corrupting part of the payload of cell 2000.

The radio transmission is received by radio 2340 of base station 20. During the receive block processing stage, the transmitted cell undergoes FEC decoding. During this stage the controller will note whether the error 2010 is uncorrectable. Then the header of the reconfigured ATM cell (which is sent to the receive processor from the receive block processing stage) is interpreted by said receive header processor. If the receive header processor determines that the header is in error, the cell is discarded. If the header is correct and there were no uncorrectable errors, the header is processed as above and the cell is forwarded.

If the header is correct and there were uncorrectable errors, and the cell is a non-final cell of a message, the cell is discarded and a discontinue signal is sent from the receive header processor 2370 to the transmit header processor 2320. The transmit header processor then sends a control packet 2020 to the radio unit 30, instructing it to discontinue transmission of the remaining non-final cells of the message. This control packet will be processed in the usual manner by the radio unit 30, and will trigger the sending of the discontinue signal from the receive header processor 370 to the transmit header processor 320 to discontinue transmission of the non-final cells of this message, as discussed above.

Note that in this example we have described this treatment assuming FEC encoding has been used. However, as stated above, we have noted that as an alternative to the FEC encoding, an additional error detection coding step could be performed, either over the payload or the entire cell. Thus, in this specification, the step of determining whether there are uncorrectable errors is used to include both determining that there are uncorrectable errors after FEC decoding attempts to correct any errors, or, if the alternative additional detection step is used, determining whether there were errors in the cell or payload using CRC or other types of error detection. Similarly for the transmit path, the step of adding additional bits for the purpose of allowing a receiver to determine whether there are uncorrectable errors is used to include both adding FEC encoding bits over the entire cell or adding additional error detection check bits over the payload or the entire cell.

We have described this treatment assuming the receive header processor sends a discontinue signal to the transmit header processor to discontinue transmitting non-final cells of a message. As an alternative, the receive header processor can send a discontinue signal to the cell buffering block to flush the buffer of all non-final cells of the message.

As discussed above, one optional feature includes compressing the header information. It should be noted that conventional ATM cell addresses allow for many more VPI/VCI addresses than are necessary for many wireless applications. Thus, the address information can be compressed if a smaller number of total circuits is allowed.

Numerous other modifications, variations and adaptations may be made to the particular embodiments of the invention described above without departing from the scope of the invention, which is defined in the claims.

What is claimed is:

1. A transceiver for receiving and transmitting data cells over a wireless interface, said transceiver comprising:
   a block processor having a transmit path for reconfiguring cells for transmission over the wireless interface and a receive path for receiving transmitted signals and processing received reconfigured cells;
   wherein said block processor includes:
       a transmit header processor for assembling a new header for a cell to be transmitted, including:
           means for extracting a Header Error Check (HEC) from said cell, and
           means for calculating and inserting an Exended Header Error Check (EHEC) into said cell header;
       a receive header processor, including:
           means for extracting EHEC from a received cell,
           means for replacing said EHEC with an HEC, and
           means for detecting errors in said received cell header; and
           means for discarding a received cell if an error in the header is detected.

2. A transceiver as claimed in claim 1, further comprising means for forwarding a received cell if no error in header is detected.

3. A transceiver as claimed in claim 1, wherein said block processor includes a transmit block processing stage and a receive block processing stage, wherein said transmit block processing stage includes means for adding additional bits for the purpose of allowing a receiver of the cell to determine whether there are uncorrectable errors, and wherein said receive block processing stage includes means for determining whether there are uncorrectable errors.

4. A transceiver as claimed in claim 3, wherein said means for adding additional bits adds said bits on a per cell basis.

5. A transceiver as claimed in claim 3, wherein said means for adding additional bits adds said bits on a per block basis.

6. A transceiver as claimed in claim 3, wherein said means for adding additional bits performs forward error correction encoding.

7. A transceiver as claimed in claim 3, wherein said means for adding additional bits adds additional error detection bits.

8. A transceiver as claimed in claim 3, wherein said receive header processor further includes means for determining an error is present in said payload if the receiver determines there were uncorrectable errors and no error is detected in said header.

9. A transceiver as claimed in claim 8, wherein said receive header processor further includes:
   means for determining the nature of the payload by evaluating the header information; and
   means for selecting from a number of payload treatment processes to execute if an error is present in said payload; wherein the payload treatment process is selected based on the nature of the payload from the group of processes comprising:
       forwarding the cell,
       forwarding the cell with a flag,
       discarding the cell, and
       producing an error indication to a higher layer protocol.

10. A transceiver as claimed in claim 9, wherein said transmit header processor further comprises means for compressing header information from a conventional header format into a compressed header format; and
    wherein said receive header processor further comprises means for uncompressing header information from said compressed format into said conventional format if no errors in header are detected.

11. A transceiver as claimed in claim 8, wherein said header includes a payload type identifier which identifies whether a cell is the final cell of said message, and wherein said transmit header processor further comprises:
    means for evaluating the header to determine whether said cell belongs to a message and whether said cell is the final cell of said message,
    means for adding a message sequence identifier to said header identifying to which message the cell belongs,
    means for discontinuing the transmission of non-final cells of a particular message if a discontinue indication is received; and
    wherein said receive header processor comprises:
        means for interpreting said message sequence identifier, and
        means for sending an indication to the transmitter of a cell with an error in its payload to discontinue transmitting the remaining non-final cells of said message.

12. A transceiver as claimed in claim 11, wherein said transmit header processor further comprises means for compressing header information from a conventional header format into a compressed header format; and
    wherein said receive header processor further comprises means for uncompressing header information from said compressed format into said conventional format if no errors in header are detected.

13. A transceiver as claimed in claim 8, wherein said transmit header processor further comprises:

means for evaluating the header to determine whether said cell belongs to a message, means for adding a message sequence identifier to said header identifying to which message the cell belongs, and means for discontinuing the transmission of cells of a particular message if a discontinue indication is received; and wherein said receive header processor comprises:

means for interpreting said message sequence identifier, and means for sending an indication to the transmitter of a cell with an error in its payload to discontinue transmitting the remaining cells of said message.

14. A transceiver as claimed in claim 8, wherein said transmit header processor further comprises:

means for adding a payload type identifier which identifies whether a cell forms part of a message and if so, whether said cell is the last cell of said message, and means for adding a message sequence identifier to said header identifying to which message the cell belongs, and means for discontinuing the transmission of non-final cells of a particular message if an indication to do so is received; and wherein said receive header processor comprises:

means for interpreting said message sequence identifier, and means for sending an indication to the transmitter of a cell with an error in its payload to discontinue transmitting the remaining non-final cells of said message.

15. A transceiver as claimed in claim 1, wherein said transmit header processor further comprises means for compressing header information from a conventional header format into a compressed header format; and wherein said receive header processor further comprises means for uncompressing header information from said compressed format into said conventional format if no errors in header are detected.

16. A method for treating transmission errors in data cells which include a first data field, a check on said first data field, and at least one additional data field, wherein each cell is transmitted with additional bits for the purpose of allowing a receiver of the cell to determine whether there are uncorrectable errors, wherein said first data field comprises the cell header, and wherein said at least one additional data field comprises the payload, said method comprising:

detecting errors on said first data field;

detecting uncorrected errors on said cell;

determining an error is present in said at least one additional data field if an uncorrected error is detected in said cell and no error is detected in said first data field;

determining the nature of the payload by evaluating the header information; and executing a treatment process depending on the type of cell and the field in error;

wherein said executing an appropriate treatment step comprises:

discarding said cell if said detecting errors on said first data field detects an error in said first data field; and selecting from a number of payload treatment processes to execute if no error is detected in said first data field and an error is detected in said at least one additional data field; wherein the payload treatment process is selected based on the nature of the payload as determined in said determining the nature of the payload step.

17. The method as claimed in claim 16, wherein determining the nature of the payload step comprises evaluating the address, payload type identifier, and message sequence fields of said header, and wherein said selecting step comprises selecting a message treatment process from the number of payload treatment processes if said header indicates said cell is a non-final cell of a message, said message treatment process comprises the steps of:

a) discarding said cell; and b) sending a discontinue message to the transmitter of said cell.

18. A radio unit adapted to carry out the method of claim 17.

19. A wireless network adapted to carry out the method of claim 17.

20. A radio unit adapted to carry out the method of claim 16.

21. A wireless network adapted to carry out the method of claim 16.

22. A method for receiving and transmitting data cells over a wireless interface, wherein said data cells include a header, a header error check (HEC) computed on said header and payload, said method comprising:

at a transmitter;

calculating an extended HEC (EHEC) on a cell header of cell to be transmitted;

reconfiguring said cell to be transmitted by replacing the HEC with said calculated EHEC to form a reconfigured cell;

transmitting said reconfigured cell; and at a receiver:

receiving said reconfigured cell;

detecting errors in the header of the received cell by calculating the expected value of the EHEC on the received header and comparing said calculated EHEC with the received EHEC;

discarding the received cell if an error in the header is detected; and replacing said EHEC with an HEC, and then forwarding the cell if no error in the header is detected.

23. The method as claimed in claim 22 further comprising:

adding additional bits for the purpose of allowing a receiver of the cell to determine whether there are uncorrectable errors during transmission; and determining whether there are uncorrectable errors during reception.

24. The method as claimed in claim 23 wherein said step of adding additional bits comprises performing forward error correction encoding on each cell prior to transmission.

25. A wireless network adapted to carry out the method of claim 24.

26. The method as claimed in claim 23 further comprising the step of determining an error is present in the payload of a received cell if the determining whether there are uncorrectable errors during reception step determines there were uncorrectable errors and no error is detected in said header.

27. The method as claimed in claim 26 further comprising the steps of:
- determining the nature of the payload by evaluating the header information; and
- selecting from a number of payload treatment processes to execute if an error is present in said payload; wherein the payload treatment process is selected based on the nature of the payload from the group of processes comprising:
  - forwarding the cell,
  - forwarding the cell with a flag,
  - discarding the cell, and
  - producing an error indication to a higher layer protocol.

28. The method as claimed in claim 26 wherein said header includes a payload type identifier which identifies whether a cell is the final cell of a message, and wherein said method further comprising the steps of:
- during transmission:
  - evaluating the header to determine whether said cell belongs to a message and whether said cell is the final cell of said message,
  - adding a message sequence identifier to said header identifying to which message the cell belongs, and
  - discontinuing the transmission of non-final cells of a particular message if a discontinue indication is received; and
- during reception:
  - interpreting said message sequence identifier, and
  - sending an indication to the transmitter of a cell with an error in its payload to discontinue transmitting the remaining non-final cells of said message.

29. The method as claimed in claim 26 wherein said header includes a payload type identifier which identifies whether a cell is the final cell of a message, and wherein said method further comprising the steps of:
- during transmission:
  - evaluating the header to determine whether said cell belongs to a message and whether said cell is the final cell of said message, and
  - discontinuing the transmission of non-final cells of said message if a discontinue indication is received; and
- during reception:
  - determining whether a cell with an error in its payload belongs to a message, and if so, discarding said cell and sending an indication to the transmitter of a cell with an error in its payload to discontinue transmitting the remaining non-final cells of said message.

30. The method as claimed in claim 26 wherein said identifies whether a cell is the final cell of a message, and wherein said method further comprising the steps of, during reception:
- determining whether a cell with an error in its payload belongs to a message, and if so, discarding said cell and all subsequently received non-final cells of said message.

31. The method as claimed in claim 30 further comprising during transmission:
- evaluating the header to determine whether said cell belongs to a message and whether said cell is the final cell of said message, and
- discontinuing the transmission of non-final cells of said message if a discontinue indication is received; and
- during reception:
  - determining whether a cell with an error in its payload belongs to a message, and if so, discarding said cell and sending an indication to the transmitter of a cell with an error in its payload to discontinue transmitting the remaining non-final cells of said message.

32. A radio unit adapted to carry out the method of claim 23.

33. A radio unit adapted to carry out the method of claim 22.

34. A wireless network adapted to carry out the method of claim 22.

* * * * *